(12) United States Patent
Bernstetter et al.

(10) Patent No.: US 10,955,070 B2
(45) Date of Patent: Mar. 23, 2021

(54) RECEIVING DEVICE FOR RECEIVING A LINE-SHAPED COMPONENT

(71) Applicant: Bayerische Motoren Werke Aktiengesellschaft, Munich (DE)

(72) Inventors: Bernhard Bernstetter, Moosthenning (DE); Gunnar Eichmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 26 days.

(21) Appl. No.: 16/415,062

(22) Filed: May 17, 2019

(65) Prior Publication Data

US 2019/0271414 A1    Sep. 5, 2019

Related U.S. Application Data

(63) Continuation of application No. PCT/EP2017/075779, filed on Oct. 10, 2017.

(30) Foreign Application Priority Data

Nov. 18, 2016 (DE) ...................... 10 2016 222 708.4

(51) Int. Cl.
*F16L 3/13* (2006.01)
*B60R 16/02* (2006.01)
(Continued)

(52) U.S. Cl.
CPC ............ *F16L 3/13* (2013.01); *B60R 16/0215* (2013.01); *F16L 3/24* (2013.01); *F16L 3/26* (2013.01);
(Continued)

(58) Field of Classification Search
CPC combination set(s) only.
See application file for complete search history.

(56) References Cited

U.S. PATENT DOCUMENTS 4,244,544 A * 1/1981 Kornat ...................... F16L 3/13
248/68.1
4,358,080 A * 11/1982 Wolker ............... F16B 37/0842
174/166 R
(Continued)

FOREIGN PATENT DOCUMENTS

| CN | 101680575 A | 3/2010 |
| DE | 35 03 293 A1 | 8/1985 |

(Continued)

OTHER PUBLICATIONS

Chinese-language Office Action issued in Chinese Application No. 201780056440.0 dated Apr. 21, 2020 with English translation (18 pages).

(Continued)

*Primary Examiner* — Monica E Millner
(74) *Attorney, Agent, or Firm* — Crowell & Moring LLP

(57) ABSTRACT

A receiving device is provided for receiving a line-shaped component. The receiving device has an arrangement region which extends in the longitudinal direction and a receiving opening which extends in the longitudinal direction for introducing the line-shaped component into the arrangement region. The receiving opening has a first opening width in a central region extending in the longitudinal direction. The first opening width is constant in the entire central region. A second opening width in at least one end region is larger than the first opening width.

18 Claims, 6 Drawing Sheets

(51) Int. Cl.
  *F16L 3/24* (2006.01)
  *F16L 3/26* (2006.01)
  *B60K 15/01* (2006.01)
  *B60R 16/08* (2006.01)
  *F16L 3/22* (2006.01)

(52) U.S. Cl.
  CPC ............... *B60K 15/01* (2013.01); *B60R 16/08* (2013.01); *F16L 3/22* (2013.01)

(56) References Cited

U.S. PATENT DOCUMENTS

| | | | | |
|---|---|---|---|---|
| 4,566,660 | A * | 1/1986 | Anscher | F16L 3/13 24/453 |
| 4,840,334 | A * | 6/1989 | Kikuchi | F16L 3/13 24/453 |
| 5,441,224 | A * | 8/1995 | Ludwig | F16L 3/22 248/74.2 |
| 5,458,303 | A * | 10/1995 | Ruckwardt | F16L 3/237 248/74.2 |
| 6,206,330 | B1 * | 3/2001 | Oi | F16B 37/0842 248/635 |
| 6,290,201 | B1 * | 9/2001 | Kanie | F16F 15/04 248/562 |
| 6,708,931 | B2 * | 3/2004 | Miura | F16B 37/00 248/635 |
| 7,090,169 | B2 * | 8/2006 | Swanson | B64D 17/24 244/142 |
| 7,267,307 | B2 * | 9/2007 | Bauer | F16L 3/223 248/65 |
| 7,377,472 | B2 * | 5/2008 | Brown | F16L 3/10 248/74.1 |
| 7,658,350 | B2 * | 2/2010 | Bauer | F16L 3/223 248/65 |
| 8,167,252 | B2 * | 5/2012 | Nitsche | F16L 3/245 248/68.1 |
| 8,342,459 | B2 * | 1/2013 | Garrison | H01R 12/63 248/68.1 |
| 8,356,778 | B2 * | 1/2013 | Birli | F16L 3/243 248/73 |
| 8,668,174 | B2 * | 3/2014 | Kato | F16L 3/222 248/74.2 |
| 8,910,912 | B2 * | 12/2014 | Child | F16L 3/2235 248/73 |
| 10,655,374 | B2 * | 5/2020 | Fukumoto | F16L 3/223 |
| 2004/0065785 | A1 * | 4/2004 | Miura | F16L 3/223 248/62 |
| 2009/0026673 | A1 | 1/2009 | Clark et al. | |
| 2009/0223041 | A1 | 9/2009 | Garrison et al. | |
| 2011/0147542 | A1 | 6/2011 | Hoek | |
| 2013/0146720 | A1 * | 6/2013 | Meyers | F16L 3/223 248/68.1 |
| 2014/0070070 | A1 | 3/2014 | Shinoda | |
| 2014/0260083 | A1 | 9/2014 | Zhang et al. | |
| 2015/0041600 | A1 * | 2/2015 | Sampson | F16L 3/1211 248/68.1 |
| 2015/0219132 | A1 | 8/2015 | Lacroix | |
| 2016/0178088 | A1 * | 6/2016 | Stadler | H02G 3/0487 248/68.1 |
| 2017/0097109 | A9 * | 4/2017 | Dickinson | F16L 3/12 |

FOREIGN PATENT DOCUMENTS

| | | |
|---|---|---|
| DE | 195 47 070 A1 | 6/1997 |
| DE | 20 2007 014 958 U1 | 3/2008 |
| DE | 20 2008 000 510 U1 | 4/2008 |
| DE | 10 2013 109 517 A1 | 3/2014 |
| DE | 10 2014 001 382 A1 | 8/2015 |
| EP | 0 597 718 A1 | 5/1994 |
| EP | 0 950 845 A2 | 10/1999 |
| EP | 2 221 518 A2 | 8/2010 |
| EP | 2 450 729 A2 | 5/2012 |
| GB | 2 154 648 A | 9/1985 |
| WO | WO 2012/080242 A2 | 6/2012 |

OTHER PUBLICATIONS

International Search Report (PCT/ISA/210) issued in PCT Application No. PCT/EP2017/075779 dated Dec. 21, 2017 with English translation (six (6) pages).

German-language Written Opinion (PCT/ISA/237) issued in PCT Application No. PCT/EP2017/075779 dated Dec. 21, 2017 (seven (7) pages).

German-language Search Report issued in counterpart German Application No. 10 2016 222 708.4 dated Sep. 14, 2017 with partial English translation (10 pages).

\* cited by examiner

RECEIVING DEVICE FOR RECEIVING A LINE-SHAPED COMPONENT

CROSS REFERENCE TO RELATED APPLICATIONS

This application is a continuation of PCT International Application No. PCT/EP2017/075779, filed Oct. 10, 2017, which claims priority under 35 U.S.C. § 119 from German Patent Application No. 10 2016 222 708.4, filed Nov. 18, 2016, the entire disclosures of which are herein expressly incorporated by reference.

BACKGROUND AND SUMMARY OF THE INVENTION

The invention relates to a receiving device and, more particularly to a receiving device preferably designed for receiving a line-shaped component, such as a cable or a line, for example.

The prior art discloses holding clips for receiving line-shaped components. DE 195 47 070 A1 shows, for example, a fastening device having a holding element for a line, in particular for a fuel line of a motor vehicle, wherein the holding element has a fastening part which can be mounted in a positionally fixed manner and a clamping part which at least partially surrounds the line.

During mounting, the lines to be fastened are often manually fitted laterally into the holding clip, i.e. not parallel to the track of the holding clip. The mounting forces for the personnel are relatively high when clipping in the lines. However, the mounting forces cannot be readily reduced, since otherwise the demounting forces would become too small and there would be a risk of the lines becoming detached.

Taking the prior art as a starting point, an object to be achieved by at least some embodiments is therefore to provide a receiving device for receiving a line-shaped component, by means of which the mounting force when fitting in a line can be considerably reduced, thereby making it possible to achieve a force and time saving when mounting the line. On the other hand, the demounting force or holding force of the receiving device is intended to remain virtually unchangedly high.

According to at least one embodiment, the receiving device for receiving a line-shaped component has an arrangement region which extends in a longitudinal direction and a receiving opening which extends in the longitudinal direction and is intended for inserting the line-shaped component into the arrangement region. After inserting the line-shaped component, the latter can preferably be held in the arrangement region and bear, for example, on a surface of the receiving opening over the entire extent of the receiving opening in the longitudinal direction.

The receiving opening has a first opening width in a central region extending in the longitudinal direction, said first opening width being constant in the entire central region. The receiving opening has a second opening width in at least one end region, said second opening width being greater than the first opening width.

It can thereby be advantageously ensured that a line-shaped component can be clipped in a simple manner through the receiving opening into the receiving device without, at the same time, the holding force of the receiving device being greatly reduced.

The arrangement region of the receiving device can have, for example, the shape of an open profile. In particular, the arrangement region can have a cylindrical or part-cylindrical shape which has a center axis which extends parallel to the longitudinal direction. The cylindrical or part-cylindrical shape preferably has an inside diameter which is at least as large as the diameter of the line-shaped component to be fitted in.

According to a further embodiment, the central region has a length, in particular a length in the longitudinal direction, of at least 3.0 mm. Furthermore, the central region can have a length of at least 5.0 mm. As a result, it can be ensured that a line-shaped component inserted into the receiving device is held by a sufficiently high holding force in the arrangement region.

According to a further embodiment, the end region has a length, in particular a length in the longitudinal direction, of at least 2.0 mm. Furthermore, the end region can have a length of at least 3.0 mm. It can thereby advantageously be ensured that the fitting-in forces for inserting a line-shaped component into the arrangement region are considerably reduced.

According to a further embodiment, the receiving opening has, in a further end region which is arranged on a side of the central region facing away from the end region, a further opening width which is greater than the first opening width. As a result, a line-shaped component can be fitted in a simple manner through the receiving opening into the arrangement region by being clipped in laterally in the two end regions. The further end region can have a length of at least 2.0 mm in the longitudinal direction. Furthermore, the further end region can have a length of at least 3.0 mm. The central region is preferably arranged between the end region and the further end region and preferably directly adjoins the two end regions.

According to a further embodiment, the receiving opening or the opening width of the receiving opening is increased in the end region, for example starting from the central region in a direction pointing away from the central region. The receiving opening can, for example, continuously increase in the end region. Additionally or alternatively, the receiving opening can increase or continuously increase in the further end region, starting from the central region.

According to a further embodiment, the receiving opening is formed by two mutually opposite and spaced-apart guide edges or is delimited by two mutually opposite and spaced-apart guide edges. The opening width or the opening widths can be defined in particular by the distance of the guide edges from one another. The guide edges preferably each extend parallel to the longitudinal direction in the central region, the guide edges having a continuously constant distance from one another in the central region. At least one of the guide edges can enclose an opening angle with the longitudinal direction in at least one of the end regions. For example, the guide edge can enclose a constant opening angle with the longitudinal direction in the entire end region, i.e. the guide edge can, for example, have no curvature at all in the entire end region. The opening angle can be, for example, at least 4.0°. Furthermore, the guide edge can enclose a nonconstant opening angle with the longitudinal direction in the end region. Alternatively, the guide edge can have a curvature, for example in the end region or in the entire end region.

According to a further embodiment, one of the guide edges encloses an opening angle with the longitudinal direction both in the end region and the further end region. The opening angles can, for example, be constant over the entire end region or over the entire further end region. For example, the opening angles can each be at least 4.0°.

Furthermore, the guide edge can have a curvature in the end region and in the further end region or in the entire end region and in the entire further end region.

At least one of the guide edges can thus have a bevel in the end regions, which bevel can have, for example, the shape of a wedge or a conical shape. Furthermore, at least one of the guide edges can have a radius in the end regions. As a result, a kind of funnel shape can be formed, for example, with the result that the line-shaped component can bend the receiving opening with a small expenditure of force in this region for example before the line-shaped component latches into the arrangement region.

According to a further embodiment, the other of the guide edges extends parallel to the longitudinal direction in the end region, in the central region and in the further end region. The other of the guide edges can in particular extend continuously parallel to the longitudinal direction. In other words, only one of the two guide edges can have an opening angle with the longitudinal direction in one of the end regions or in both end regions.

According to a further embodiment, the other of the guide edges encloses an opening angle with the longitudinal direction in the end region and in the further end region. This means that both guide edges enclose an opening angle with the longitudinal direction in the end regions and extend parallel to one another and parallel to the longitudinal direction in the central region. As a result, the fitting-in forces can be reduced particularly effectively.

According to a further embodiment, the receiving device has a first insertion wing and a second insertion wing, wherein the insertion wings are each connected to one of the guide edges. The insertion wings can serve in particular as insertion aids. As a result, the fitting-in of a line-shaped component can be simplified. The insertion wings preferably have a greater distance from one another on the end portions facing away from the guide edges than on the end portions facing the guide edges.

According to a further embodiment, the receiving device has a holding portion for fastening the receiving device, in particular for fastening the receiving device to a component or a profile-shaped rail. The holding portion can be connected, for example, to the arrangement region. The holding portion, the arrangement region and the insertion wings are preferably formed in one piece. The receiving device can be produced by injection-molding, for example.

According to a further embodiment, the receiving device comprises a thermoplastic or consists of a thermoplastic. For example, the receiving device can comprise one of the following materials or consist of one of the following materials: polyamide, polypropylene, polyoxymethylene. The receiving device can comprise or consist of PA66, PA6, PP or POM-C, for example.

According to a further embodiment, the receiving device comprises a thermoplastic with embedded reinforcing fibers or consists of a thermoplastic with embedded reinforcing fibers. For example, the receiving device can comprise or consist of polyamide with glass fibers, such as, for example, PA66 GF50.

According to a further embodiment, the receiving device has a Shore hardness D of between 40 and 90. Furthermore, the receiving device can have a modulus of elasticity of between 1500 N/mm$^2$ and 16000 N/mm$^2$.

According to a further embodiment, the receiving device is designed as a clip or as a holding clip for a line. For example, the receiving device can be designed as a holding clip for lines having a diameter of between 3.0 mm and 5.0 mm, in particular for lines having a diameter of 4.0 mm.

Furthermore, the receiving device can be designed as a holding clip for lines having a diameter of greater than 5.0 mm.

The receiving device can be designed, for example, in such a way that the mounting force for fitting in a line-shaped component in the end region or in the end regions is less than the necessary mounting force for fitting in the line-shaped component in the central region. For example, the receiving device can be configured in such a way that the mounting force in the end region or in the end regions is at least 10.0 N less than in the central region. This advantageously makes it possible to achieve single-handed mounting.

According to a further embodiment, the receiving device is designed in such a way that the mounting force for fitting in a line-shaped component in the region of the end regions is less than or equal to 37.0 N and the mounting force in the central region is greater than or equal to 45.0 N, in particular greater than or equal to 47.0 N. The demounting force for removing a line-shaped component from the receiving device can be, for example, greater than or equal to 48.0 N, in particular greater than or equal to 50.0 N.

According to a further embodiment, the receiving device has one or more further arrangement regions and one or more associated receiving openings for inserting line-shaped components. The arrangement region or the further arrangement regions and the associated receiving openings can have one or more features of the aforementioned embodiments. The further arrangement region or the further arrangement regions can be formed, for example, parallel to the first arrangement region. As a result, the receiving device can have a plurality of tracks for receiving a plurality of line-shaped components. The receiving device can thus be designed as a multiple clip.

Other objects, advantages and novel features of the present invention will become apparent from the following detailed description of one or more preferred embodiments when considered in conjunction with the accompanying drawings.

DETAILED DESCRIPTION OF THE DRAWINGS

In the exemplary embodiments and figures, identical or identically acting constituent parts may each be provided with the same reference signs.

Figure 1A:
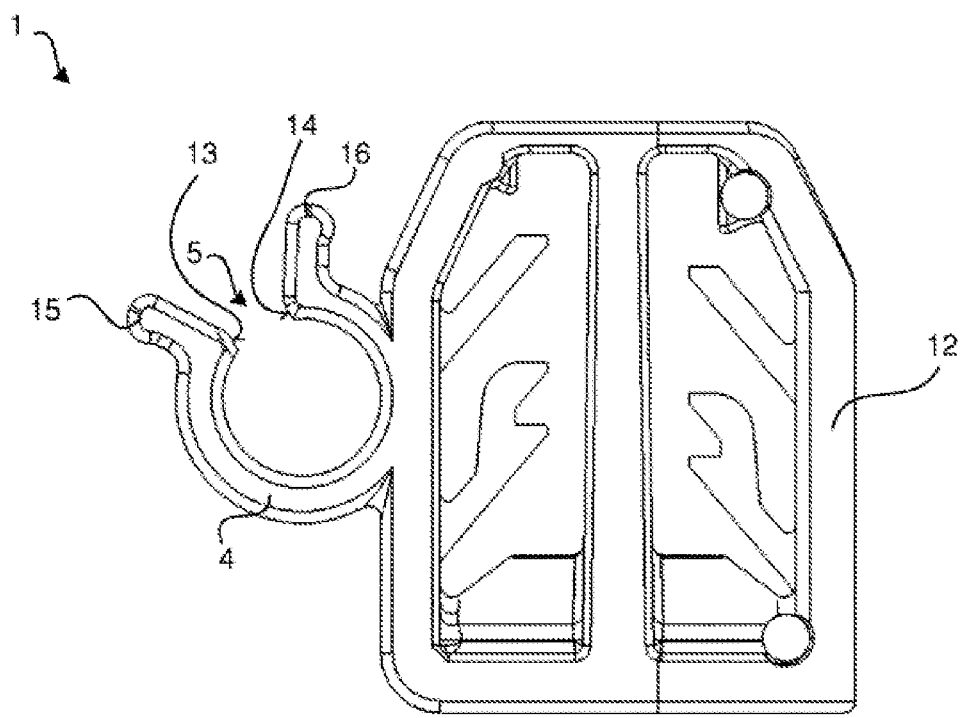
FIGS. 1A to 1C are schematic illustrations of a receiving device for receiving a line-shaped component according to a first exemplary embodiment.
Figure 1B:
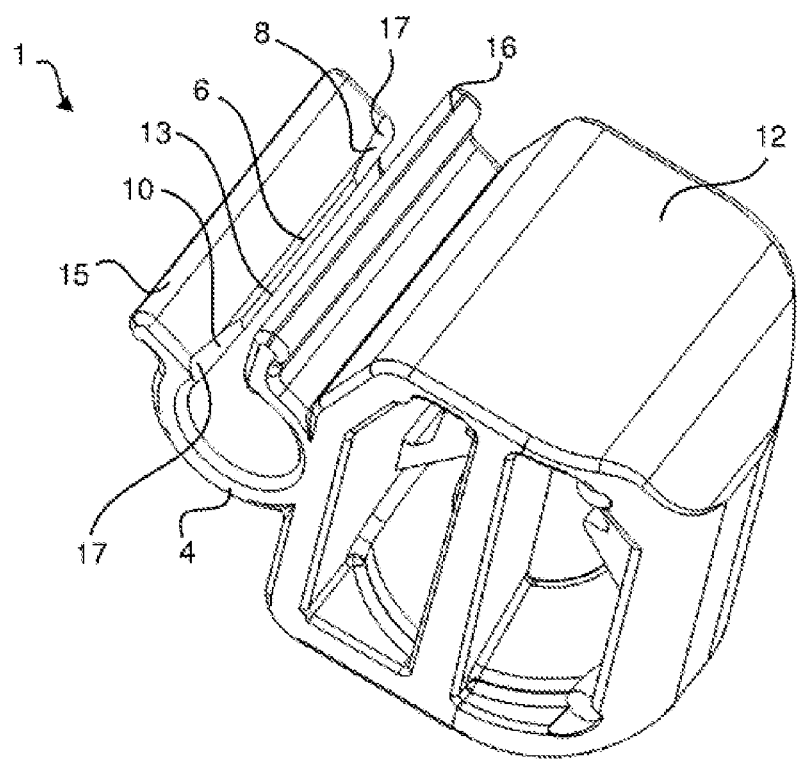
Figure 1C:
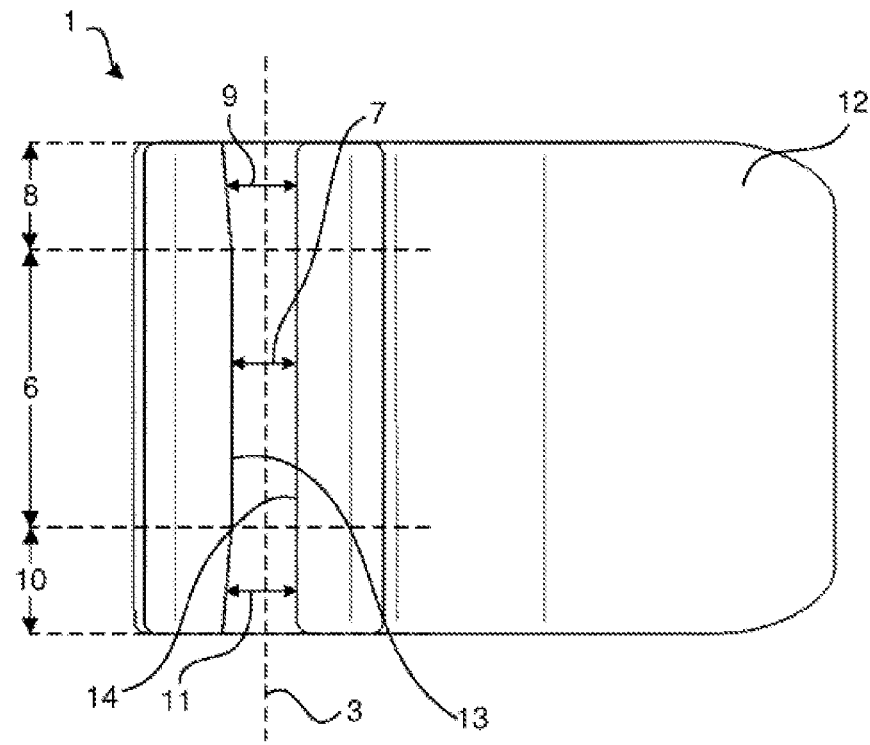

FIGS. 1A to 1C show different views of a receiving device 1 for receiving a line-shaped component, such as, for example, for receiving a cable or a line, according to a first exemplary embodiment. The receiving device 1 has an arrangement region 4 which extends in a longitudinal direction 3 and a receiving opening 5 for inserting a line-shaped component. The receiving opening 5 of the receiving device 1 likewise extends in the longitudinal direction 3. Moreover, the receiving device 1 has a holding portion 12 which is directly connected to the arrangement region 4. The holding portion 12 is designed to fasten the receiving device 1 to a component or a carrier.

The receiving opening 5 has a central region 6 in which the receiving opening 5 has a first opening width 7 which is constant in the entire central region 6. The central region 6 preferably has a length in the direction of the longitudinal direction 3 of at least 3.0 mm. Furthermore, the receiving opening 5 has a second opening width 9 in an end region 8 and a further opening width 11 in a further end region 10, wherein the second opening width 9 and the further opening width 11 are greater than the first opening width 7. The two end regions 8, 10 preferably have a length in the direction of the longitudinal direction 3 of at least 2.0 mm.

The receiving opening 5 is formed by two mutually opposite, spaced-apart guide edges 13, 14, wherein the interspace between the guide edges 13, 14 forms the receiving opening 5. The guide edges 13, 14 each extend parallel to the longitudinal direction 3 in the central region 6 and thus have a continuously constant distance from one another in the central region 6. In the illustrated exemplary embodiment according to FIGS. 1A to 1C, one of the guide edges, which here and below can also be designated as first guide edge 13 and which has a greater distance from the holding portion 12 than the other guide edge 14, has a bevel 17 both in the end region 8 and in the further end region 10. The first guide edge 13 thus encloses an opening angle with the longitudinal direction 3 in the end regions 8, 10. The opening angle in both end regions 8, 10 is preferably at least 4.0°. In the illustrated exemplary embodiment, the bevels 17 do not have a curvature. Alternatively, the bevels 17 can have a curvature, with the result that the opening angles are not constant.

The other of the two guide edges, which can here and below also be designated as second guide edge 14, extends continuously parallel to the longitudinal direction 3. In other words, the second guide edge 14 extends parallel to the longitudinal direction 3 both in the central region 6 and in the two end regions 8, 10.

The receiving device 1 furthermore has a first insertion wing 15 and a second insertion wing 16 which are each directly connected to one of the guide edges 13, 14. The insertion wings 15, 16 serve as an aid for inserting a line-shaped component through the receiving opening 5 into the arrangement region 4. The insertion wings 15, 16 preferably extend over the entire length of the guide edges 13, 14.

Figure 2A:
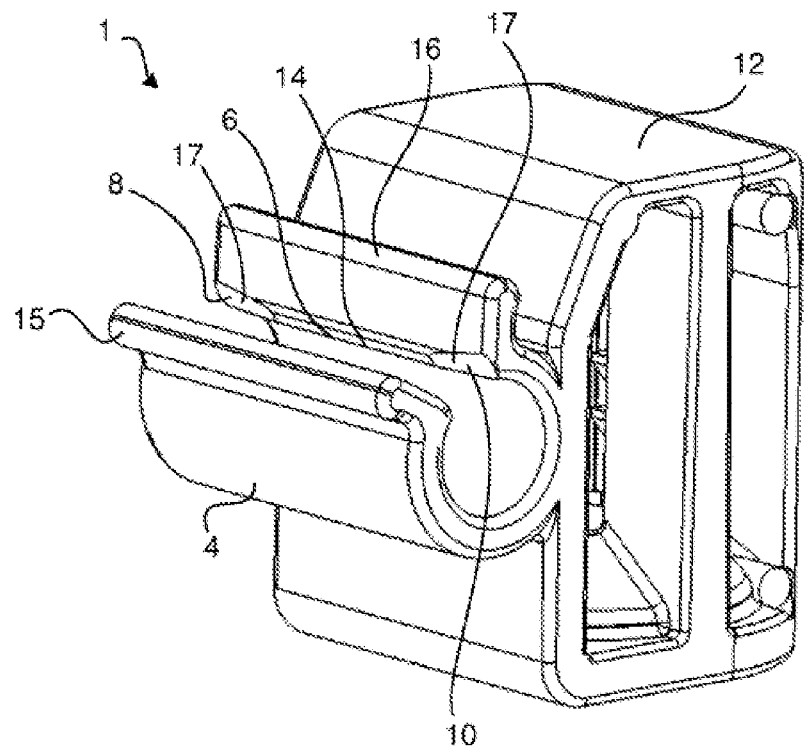
FIGS. 2A to 3B are schematic illustrations of receiving devices according to further exemplary embodiments.
Figure 2B:
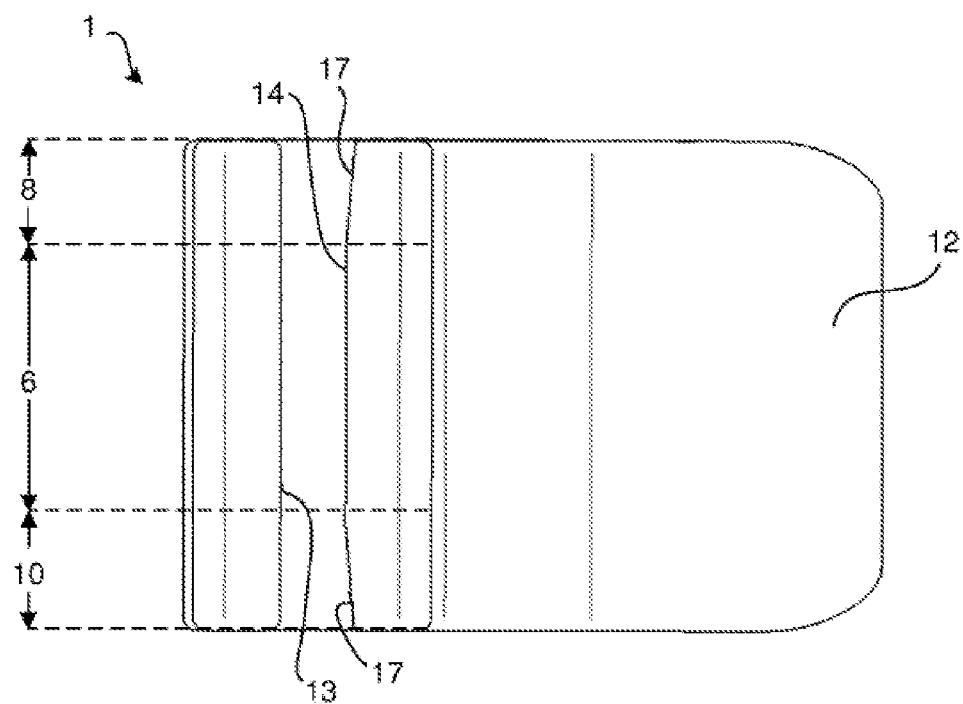

FIGS. 2A and 2B show different views of a receiving device 1 according to a further exemplary embodiment. By contrast with the exemplary embodiment shown in conjunction with FIGS. 1A to 1C, the second guide edge 14, which has a smaller distance from the holding portion 12 than the first guide edge 13, has a bevel 17 in both the end regions 8, 10, with the result that the guide edge 14 encloses an opening angle with the longitudinal direction 3 in the end regions 8, 10. By contrast, the first guide edge 13 extends continuously parallel to the longitudinal direction 3.

Figure 3A:
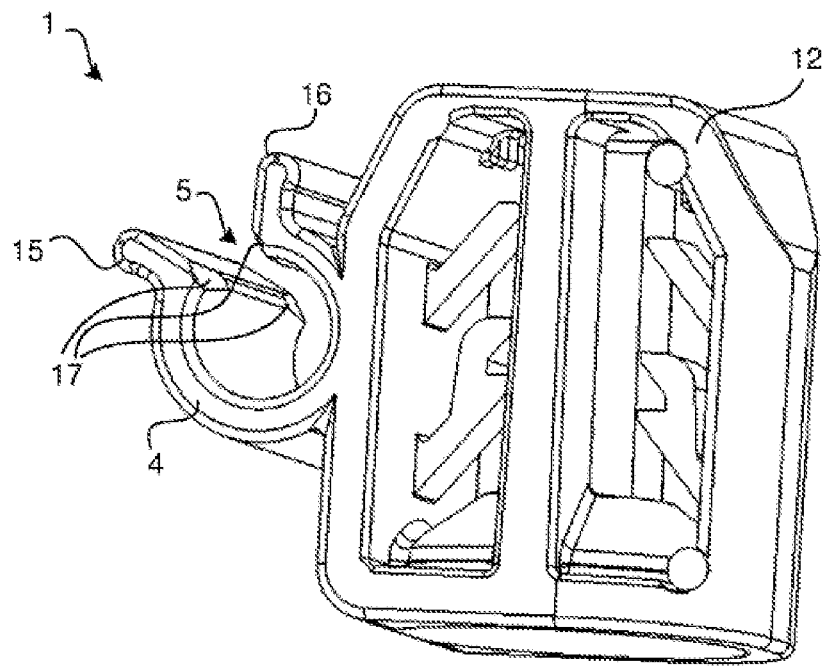
Figure 3B:
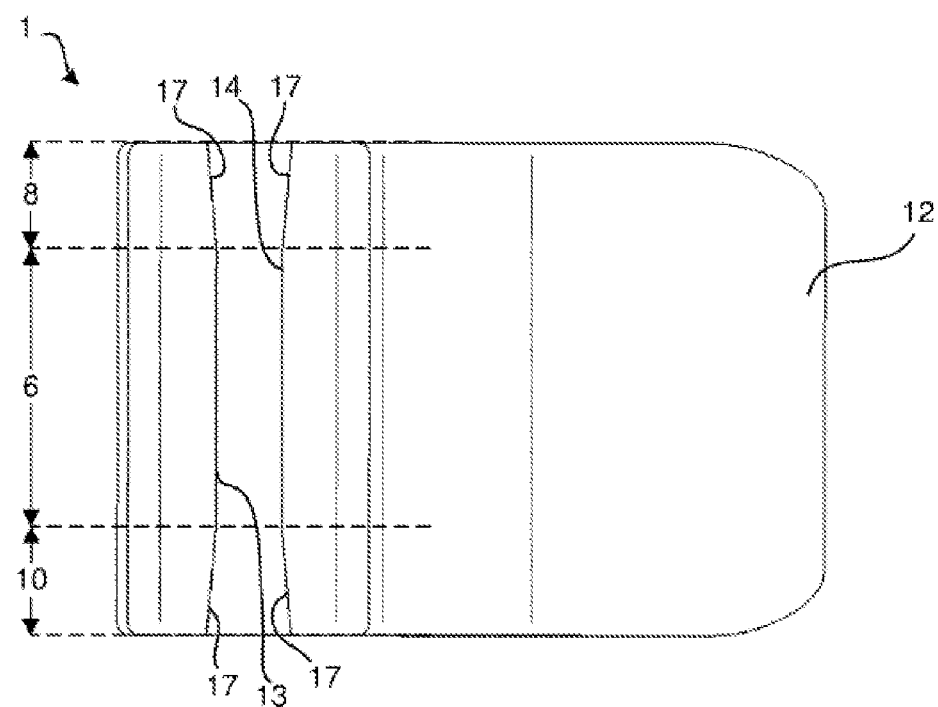

FIGS. 3A and 3B illustrate different views of a receiving device 1 according to a further exemplary embodiment. By contrast with the exemplary embodiment according to FIGS. 1A to 1C, both guide edges 13, 14 have bevels 17 in the end regions 8, 10, with the result that the guide edges 13, 14 enclose an opening angle with the longitudinal direction 3 in both the end regions 8, 10. Both guide edges 13, 14 extend parallel to the longitudinal direction 3 in the central region 6.

Figure 4A:
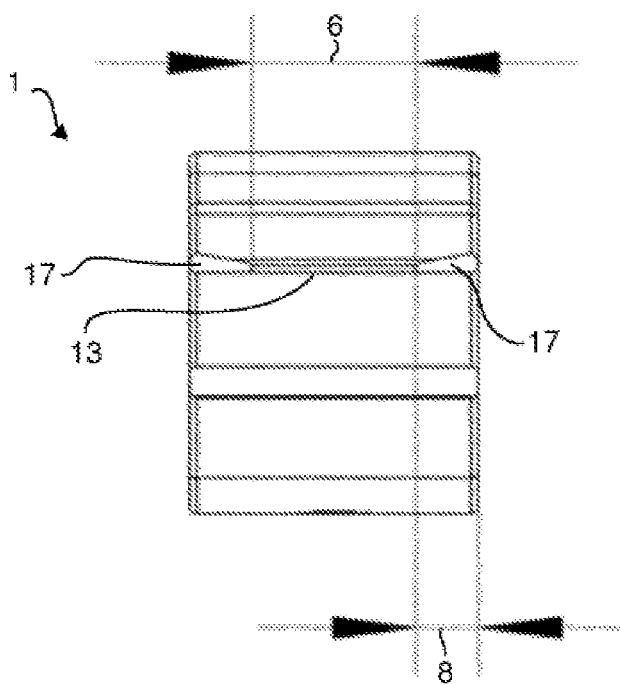
FIGS. 4A to 4C are further views of receiving devices according to further exemplary embodiments.

FIG. 4A shows a further exemplary embodiment of a receiving device 1. It is illustrated in a further view here that the first guide edge 13 has a bevel 17 in both the end regions 8, 10, which preferably have a length of at least 2.0 mm, and extends parallel to the longitudinal direction in the central region 6, which is preferably at least 3.0 mm.

Figure 4B:
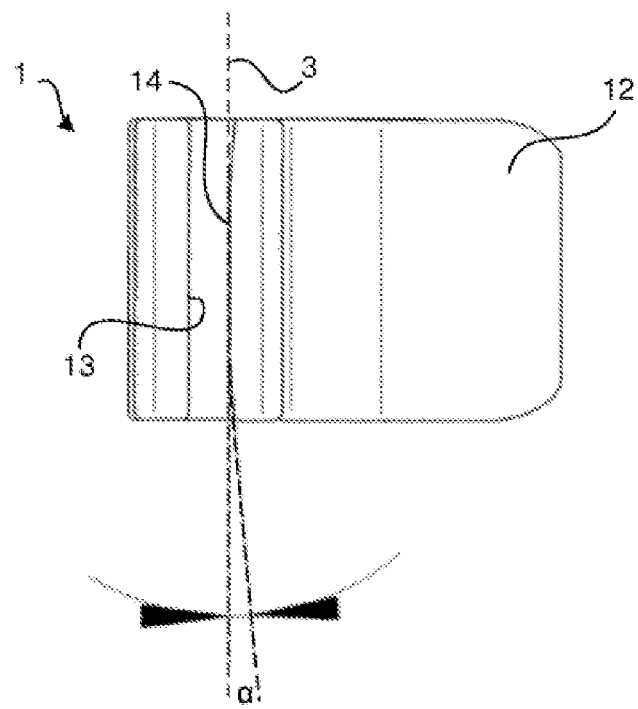

FIG. 4B illustrates the opening angle α which the second guide edge 14 encloses with the longitudinal direction 3 in the end regions 8, 10. The opening angle α is preferably at least 4°.

Figure 4C:
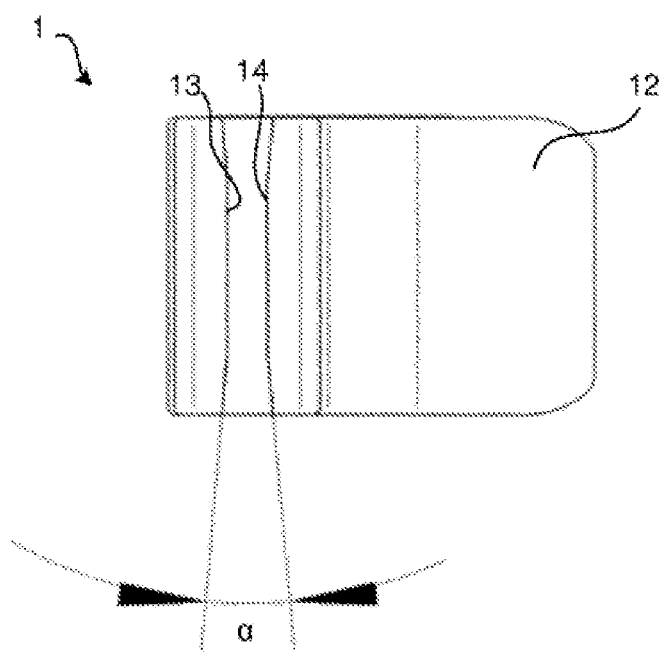

In the exemplary embodiment according to FIG. 4C, the opening angle α is defined by both of the guide edges 13, 14 in one of the end regions 8, 10. Here, the opening angle α is preferably likewise at least 4°.

Figure 5A:
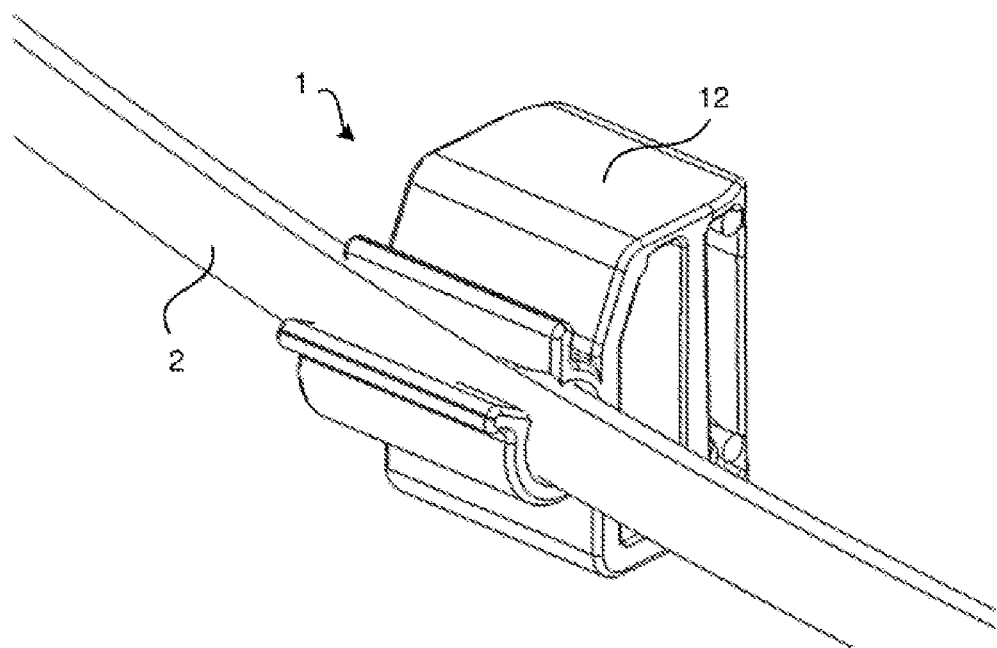
FIGS. 5A and 5B are schematic illustrations of a receiving device and of a fitted-in line-shaped component according to further exemplary embodiments.
Figure 5B:
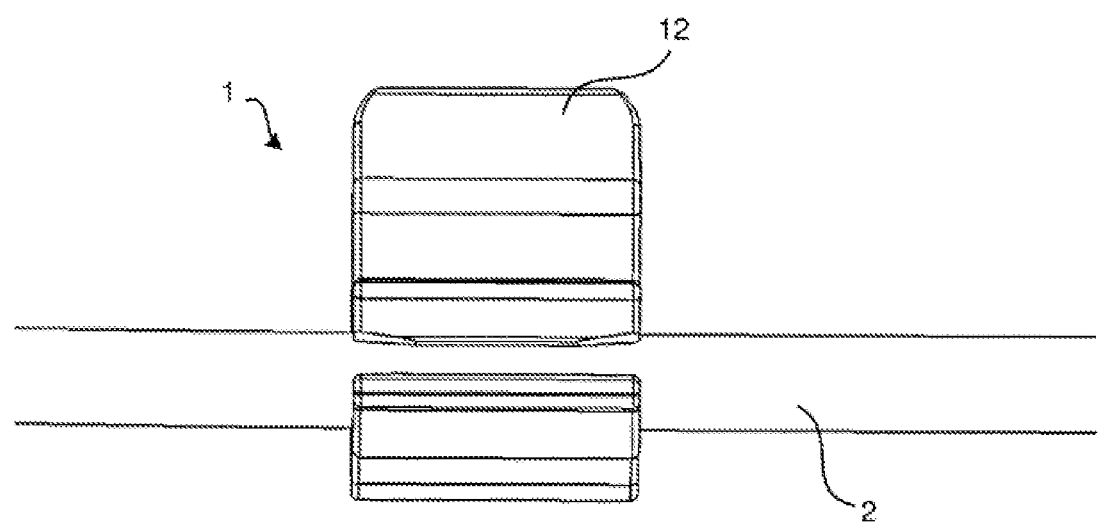

FIGS. 5A and 5B show further schematic illustrations of a receiving device 1, with it being illustrated in FIG. 5A how a line-shaped component 2 is inserted through the receiving opening 5 into the arrangement region 4 of the receiving device 1. FIG. 5B shows the receiving device 1 from FIG. 5A in a further view after the line-shaped component 2, once inserted through the receiving opening 5, is arranged in the arrangement region 4 of the receiving device 1. The arrangement region 4 preferably receives the line-shaped component 2 over its full surface area, in particular without undercut.

LIST OF REFERENCE SIGNS

1 Receiving device
2 Line-shaped component
3 Longitudinal direction
4 Arrangement region
5 Receiving opening
6 Central region
7 First opening width
8 End region
9 Second opening width
10 Further end region
11 Further opening width
12 Holding portion
13 First guide edge
14 Second guide edge
15 First insertion wing
16 Second insertion wing
17 Bevel
α Opening angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A receiving device for receiving a line-shaped component, comprising:
    an arrangement region which extends in a longitudinal direction;
    a receiving opening which extends in the longitudinal direction and is intended for inserting the line-shaped component into the arrangement region, wherein
    the receiving opening has a first opening width in a central region extending in the longitudinal direction, said first opening width being constant over the entirety of the central region, the receiving opening has a second opening width in a first end region, said second opening width being greater than the first opening width, the first opening width and the second opening width are configured such that a first mounting force for fitting in the line-shaped component in the first end region is less than a second mounting force for fitting in the line-shaped component in the central region, and the first mounting force is at least 10.0 N less than the second mounting force.

2. The receiving device as claimed in claim 1, wherein the central region has a length of at least 3.0 mm.

3. The receiving device as claimed in claim 1, wherein the receiving opening has, in a second end region which is arranged on a side of the central region facing away from the first end region, a second opening width which is greater than the first opening width.

4. The receiving device as claimed in claim 3, wherein the receiving opening increases continuously in the first end region and/or in the second end region, starting from the central region.

5. The receiving device as claimed in claim 3, wherein the receiving opening is formed by two mutually opposite and spaced-apart guide edges, the guide edges each extend parallel to the longitudinal direction in the central region and have a continuously constant distance from one another in the central region, and at least one of the guide edges encloses an opening angle with the longitudinal direction in at least one of the first and second end regions.

6. The receiving device as claimed in claim 5, wherein the opening angle is at least 4.0°.

7. The receiving device as claimed in claim 5, wherein one of the guide edges encloses an opening angle with the longitudinal direction both in the first end region and in the second end region.

8. The receiving device as claimed in claim 7, wherein the other of the guide edges extends parallel to the longitudinal direction in the first end region, in the central region and in the second end region.

9. The receiving device as claimed in claim 7, wherein the other of the guide edges encloses an opening angle with the longitudinal direction both in the first end region and in the second end region.

10. The receiving device as claimed in claim 1, further comprising:

a first insertion wing and a second insertion wing, wherein the first and second insertion wings are each connected to one of the guide edges.

11. The receiving device as claimed in claim 1, further comprising:

a holding portion which is connected to the arrangement region and is configured for fastening the receiving device.

12. The receiving device as claimed in claim 1, wherein the receiving device comprises a thermoplastic.

13. The receiving device as claimed in claim 12, wherein the receiving device has a Shore hardness D of between 40 and 90.

14. The receiving device as claimed in claim 1, wherein the receiving device has a Shore hardness D of between 40 and 90.

15. The receiving device as claimed in claim 13, wherein the receiving device has a modulus of elasticity of between 1500 N/mm2 and 16000 N/mm2.

16. The receiving device as claimed in claim 1, wherein the receiving device has a modulus of elasticity of between 1500 N/mm2 and 16000 N/mm2.

17. The receiving device as claimed in claim 1, wherein the receiving device is configured as a holding clip for a line.

18. The receiving device as claimed in claim 1 in combination with a line-shaped component, wherein the line-shaped component is disposed in the arrangement region and wherein the line-shaped component is a fuel line of a motor vehicle.

* * * * *